United States Patent
Kawao et al.

(10) Patent No.: US 9,218,832 B2
(45) Date of Patent: Dec. 22, 2015

(54) METHOD OF REMOVING SLIDER FROM FLEXURE WITHOUT LARGE DISPLACEMENT OF THE SLIDER

(71) Applicant: NHK SPRING CO., LTD., Yokohama-shi, Kanagawa (JP)

(72) Inventors: Sei Kawao, Kanagawa (JP); Shinpei Kakiuchi, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 164 days.

(21) Appl. No.: 13/863,619

(22) Filed: Apr. 16, 2013

(65) Prior Publication Data

US 2013/0291376 A1 Nov. 7, 2013

(30) Foreign Application Priority Data

May 7, 2012 (JP) ................................. 2012-105636

(51) Int. Cl.
G11B 5/127 (2006.01)
G11B 5/48 (2006.01)

(52) U.S. Cl.
CPC ......... *G11B 5/4826* (2013.01); *Y10T 29/49023* (2015.01)

(58) Field of Classification Search
CPC ..... G11B 5/4833; G11B 5/486; H05K 1/0268
USPC ............................ 29/603.02, 603.03, 603.06, 29/603.16–603.17, 729, 760, 770; 228/160, 191, 180.21–180.22; 360/245.3, 234.5, 323, 317, 244.5, 360/294.3
See application file for complete search history.

(56) References Cited

U.S. PATENT DOCUMENTS

| | | | |
|---|---|---|---|
| 4,625,393 A * | 12/1986 | Fuchs | 29/603.12 |
| 6,829,818 B2 * | 12/2004 | Kamigama et al. | 29/603.06 |
| 7,600,310 B2 * | 10/2009 | Ho et al. | 29/603.03 |
| 8,689,429 B2 * | 4/2014 | Kawao et al. | 29/603.02 |
| 2002/0195476 A1 * | 12/2002 | Baba et al. | 228/2.1 |
| 2005/0067395 A1 * | 3/2005 | Shindo et al. | 219/121.85 |
| 2006/0265862 A1 * | 11/2006 | Murakoshi | 29/603.16 |
| 2009/0303636 A1 * | 12/2009 | Inoue et al. | 360/245.3 |
| 2011/0016685 A1 | 1/2011 | Kawao et al. | |
| 2013/0291376 A1 * | 11/2013 | Kawao et al. | 29/603.02 |

FOREIGN PATENT DOCUMENTS

| | | |
|---|---|---|
| JP | 61-295696 | 12/1986 |
| JP | 07-058828 | 6/1995 |
| JP | 2011-028813 | 2/2011 |

* cited by examiner

*Primary Examiner* — Minh Trinh
(74) *Attorney, Agent, or Firm* — Jordan and Hamburg LLP (57) ABSTRACT

A method of surely removing a read/write slider from a flexure without large displacement of the slider, the slider attached to the flexure of the head suspension through an adhesive, comprises heating the slider so that the adhesive is heated through an adhered surface of the slider being in contact with the adhesive; and applying ultrasonic vibration to the slider so that the adhered surface of the slider vibrates at ultrasonic frequency with respect to the adhesive.

4 Claims, 7 Drawing Sheets

METHOD OF REMOVING SLIDER FROM FLEXURE WITHOUT LARGE DISPLACEMENT OF THE SLIDER

BACKGROUND OF THE INVENTION

1. Field of the Invention

The present invention relates to a method of removing a read/write slider attached to a flexure of a head suspension to read and write information on a disk incorporated in a hard disk drive.

2. Description of Related Art

A magnetic disk drive employ a head suspension on which a read/write slider is attached to read and write information on a disk. The head suspension has a flexure that includes a thin plate and wiring for signal transmission. To the flexure, the slider is attached through an adhesive. Hereinafter, the head suspension with the slider is also referred to as a "HGA (head gimbal assembly)."

In manufacturing of HGAs, each HGA is subjected to an examination of characteristics such as electrical characteristics and only HGAs that have passed the examination are delivered as accepted products. If a slider on a HGA is defective as a result of the examination, the defective slider is removed from the HGA to reclaim a head suspension. To the reclaimed head suspension, another slider is attached to reclaim a HGA.

JP2011-28813 A discloses a reclaiming technique to remove a slider from a HGA. In the reclaiming technique, a slider that is attached on an attaching surface of a flexure is rotated relative to the attaching surface by a torque in an in-plane direction of the attaching surface while heating the slider. With this, shearing force acts on an adhesive between the slider and the attaching surface. As a result, the slider is easily and surely removed from the flexure.

The reclaiming technique, however, rotates or displaces the slider, and it is impossible to be applied to a HGA including interferences around the slider. Namely, the reclaiming technique has a limit on removing a slider.

For example, a recent HGA may have a piezoelectric element around the slider to minutely position a slider. In the HGA, the piezoelectric element creates an interference unable to apply the reclaiming technique to the HGA. In this case, it is hard to reclaim a head suspension or HGA.

SUMMARY OF THE INVENTION

An object of the present invention is to provide a method of surely removing a slider from a flexure without large displacement of the slider.

In order to accomplish the object, an aspect of the present invention provides a method of removing a read/write slider from a flexure of a head suspension, the slider attached to the flexure of the head suspension through an adhesive. The method heats the slider so that the adhesive is heated through an adhered surface of the slider being in contact with the adhesive; and applies ultrasonic vibration to the slider so that the adhered surface of the slider vibrates at ultrasonic frequency with respect to the adhesive.

According to this aspect of the present invention, the adhered surface of the slider generates shearing force due to the ultrasonic vibration on an interface between the adhered surface of the slider and the adhesive that is softened by heating. This surely removes the slider from the flexure without large displacement of the slider.

BRIEF DESCRIPTION OF THE DRAWINGS

FIGS. 6A to 7B are sectional views schematically illustrating a removing process according to the embodiment.

DETAILED DESCRIPTION OF EMBODIMENTS

A embodiment of the present invention will be explained. The embodiment provides a method of surely removing a read/write slider from a flexure of a head suspension without large displacement. The method heats the slider so that an adhesive is heated through an adhered surface of the slider being in contact with the adhesive; and applies ultrasonic vibration to the slider so that the adhered surface of the slider vibrates at ultrasonic frequency with respect to the adhesive.

Preferably, the heating and applying ultrasonic vibration are carried out at the same time by bringing a heating jig contact with the slider and vibrating the heating jig at ultrasonic frequency.

The method is applicable to a head suspension as a completed product with a flexure on which a slide is attached or to a discrete flexure on which a slider is attached. In the embodiment, a slider is removed from a flexure of a head suspension as a completed product illustrated in FIG. 1, to reclaim the head suspension.

Figure 1:
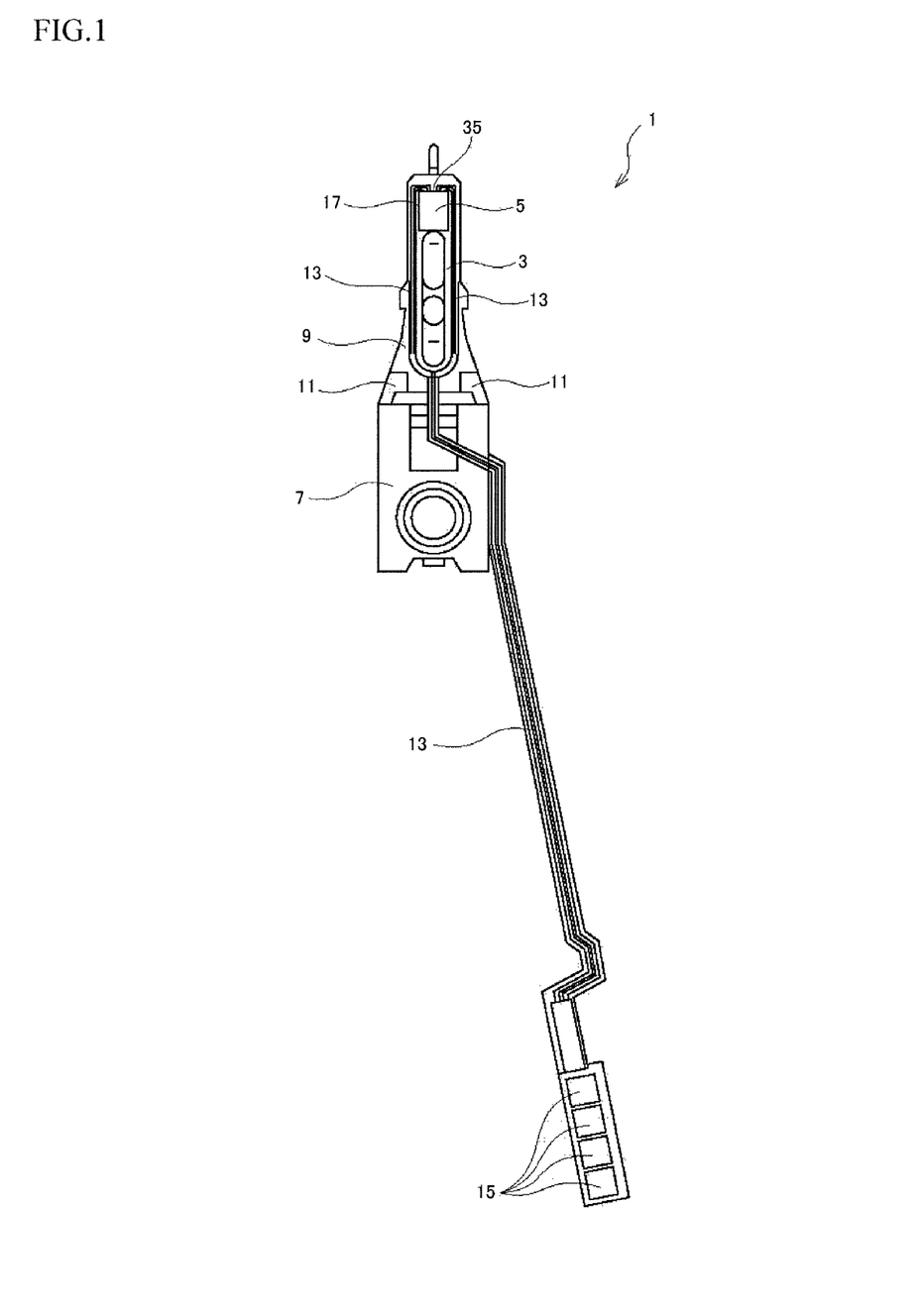
FIG. 1 is a plan view illustrating a head suspension o be reclaimed according to an embodiment of the present invention.

FIG. 1 is a plan view illustrating the head suspension 1 to be reclaimed.

The head suspension 1 to be reclaimed has a base plate 7, a load beam 9, and a flexure 3.

The base plate 7 supports the load beam 9 and is made of a thin plate such as stainless steel thin plate having a thickness of, for example, about 150 to 200 micrometers.

The load beam 9 applies load onto a slider 5 to be explained later. The load beam 9 is made of a thin plate such as stainless steel thin plate having a thickness of for example, about 30 to 150 micrometers, The load beam 9 has a pair of bent portions 11 through which the load beam 9 is joined to the base plate 7 by, for example, spot welding.

The flexure 3 is made of a metal thin plate such as stainless steel thin plate that is more precision and thinner than the load beam 9. The flexure 3 is fixed to the load beam 9 by, for example, spot welding. At a front end of the flexure 3. the read/write slider attached. The head suspension 1 on which the slider 5 is attached is also referred to as a "HGA (head gimbal assembly)" similar to the related art.

On the flexure 3, a wiring pattern 13 is formed through an insulating layer (not illustrated). The wiring pattern 13 extends from the front end of the flexure 3 to a base end thereof. The wiring pattern 13 is connected to the slider 5 at the front end and connected to terminals 15 for external connection at the base end. The terminals 15 are connected to a circuit board of a magnetic disk drive (not illustrated), to make an electrical connection between the slider 5 and the circuit board.

Figure 2:
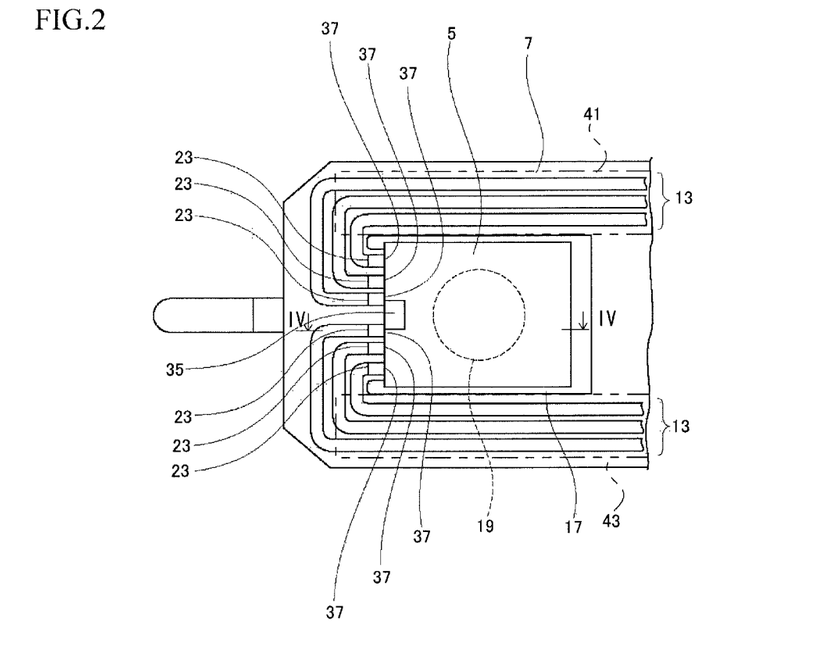
FIGS. 2 and 3 are an enlarged plan view and an enlarged perspective view illustrating a slider and the periphery thereof on the head suspension of FIG. 1.
Figure 3:
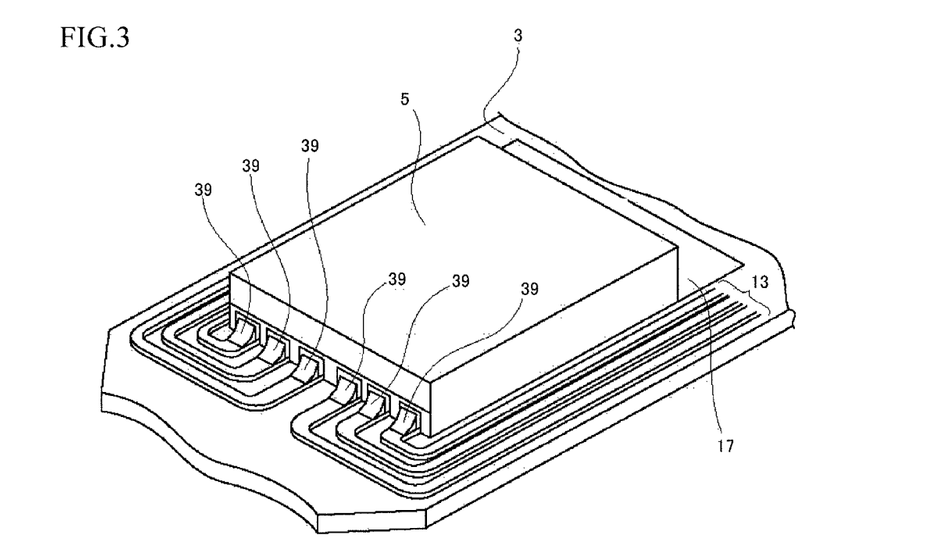
Figure 4:
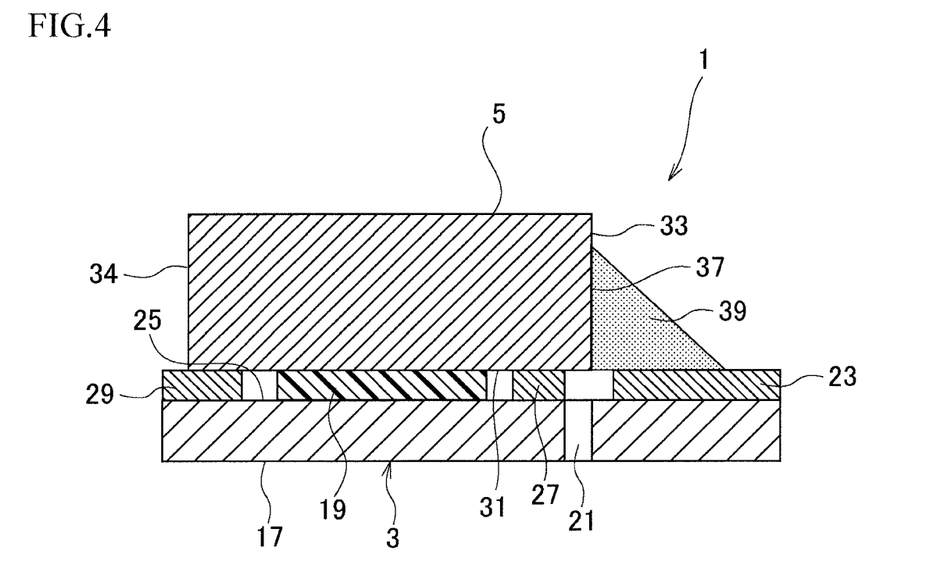
FIG. 4 is a schematic sectional view taken along a line IV-IV of FIG. 2.

FIG. 2 is an enlarged plan view illustrating the slider 5 and the periphery thereof on the head suspension 1 of FIG. 1, FIG. 3 is an enlarged perspective view illustrating the same, and FIG. 4 is a schematic sectional view taken along a line IV-IV of FIG. 2. It should be noted that, although the shapes illustrated in FIGS. 1-4 are slightly different from each other, they are basically of the same structure.

In FIGS. 2-4, the front end of the flexure 3 has a tongue 17 and the slider 5 is attached on the tongue 17 through an adhesive 19.

The tongue 17 is a cantilever member supported by the flexure 3 and has a substantial rectangular shape. A base end of the cantilevered tongue 17, a slit-like hole 21 is formed. At one side of the hole 21, i.e., the base end side of the cantilevered tongue 17 relative to the hole 21, a plurality of terminals 23 of the wiring pattern 13 are formed on a surface of the flexure 3 or the tongue 17. At the other side of the hole 21, i.e., a tip end side of the cantilevered tongue 17 relative to the hole 21, the surface of the tongue 17 defines an adhering surface 25 relative to the slider 5.

On edges of the adhering surface 25, bolsters 27 and 29 are formed by a part of the wiring pattern 13. The holsters 27 and 29 may be formed by a combination of a part of the insulating layer and a part of the wiring pattern 13 or by only a part of the insulating layer. The bolsters 27 and 29 keep an installed height of the slider 5 with respect to the tongue 17 and provides a receiver for the adhesive 19 on the tongue 17.

The slider 5 is put on the bolsters 27 and 29 and is adhered to the adhering surface 25 of the tongue 17 through the adhesive 19 that is positioned between the bolsters 27 and 29. The adhesive 19 may be mainly made of a thermosetting resin material such as epoxy-based resin or urethane-based resin.

The slider 5 is made of, for example, ceramics and has rectangular sectional and planer shapes. The slider 5 has a bottom surface as an adhered surface 31 facing the tongue 17 between the holsters 27 and 29.

The slider 5 has a first end face 33 and a second end face 34 in a longitudinal direction of the slider 5. The longitudinal direction of the slider 5 corresponds to a. longitudinal direction of the head suspension 1, the flexure 3, or the tongue 17. The first end face 33 includes a read/write magnetic head 35 and a plurality of terminals 37 for the magnetic head 35.

The terminals 37 of the slider 5 are fixedly connected to the respective terminals 23 of the wiring pattern 13 through solder ball bondings 39 as fixatives. Hereinafter, the solder ball bonding 39 are referred to as a "SBB 39."

On both sides in a lateral direction of the slider 5, piezoelectric elements 41 and 43 are disposed to minutely position the slider 5 or the magnetic head 35 as illustrated in FIG. 2 with dotted lines. The piezoelectric elements 41 and 43 are connected to the wiring pattern 13 of the flexure 3 and minutely displaces the slider 5 according to voltage applied thereto.

Above, the head suspension I is an example for explaining the method of removing the slider 5. The method may be used for other head suspensions different from the head suspension 1 as long as a slider is attached to a head suspension through an adhesive.

A method of reclaiming the head suspension 1 (reclaiming method) employing the method of removing the slider 5 (removing method) will be explained.

The reclaiming method removes the slider 5 from the tongue 17 of the flexure 3 of the HGA to reclaim the head suspension 1 if the slider 5 is defective as a result of an examination of characteristics such as electrical characteristics.

According to the embodiment, the slider 5 is attached to the tongue 17 of the flexure 3 of the HGA by the SBBs 39 and the adhesive 19 as mentioned above. The reclaiming method, therefore, includes a cutting process to cut the SBBs 39 in advance and a removing process to remove the slider 5 after cutting the SBBs 39.

FIGS. 5A to 5D are sectional views schematically illustrating the cutting process.

Figure 5A:
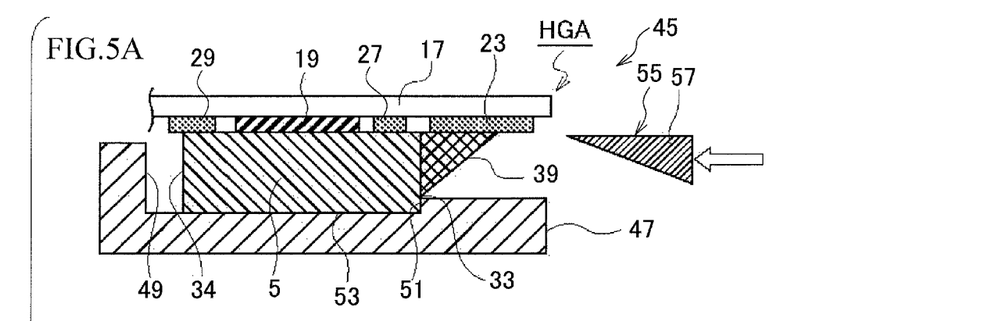
FIGS. 5A to 5D are sectional view schematically illustrating a cutting process according to the embodiment.

The cutting process is carried out with use of, for example, a cutting jig 45. As illustrated in FIG. 5A, the cutting jig 45 has a base 47 and a cutter 55. The base 47 includes a guide groove 53 that extends between stepped portions 49 and 51 formed on the base 47. The cutting jig 45 holds the slider 5 in the guide groove 53 so that the slider 5 is slidably movable in a give range in a longitudinal direction of the guide groove 53. The longitudinal direction of the guide groove 53 corresponds to that of the slider 5.

Figure 5B:
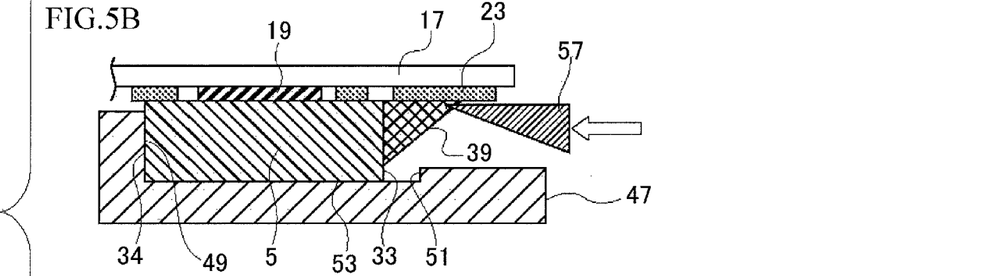

As illustrated in FIG. 513, the cutting jig 45 has a cutter 55 that advances in the longitudinal direction of the guide groove 53 toward the guide groove 53. With the advance, the cutter 55 is pushed against the SBBs 39 from the one side of the slider 5 in the longitudinal direction thereof to cut the SBBs 39 by cutting force while receiving the slider 5 at the other side.

In particular, an cutting blade 57 of the cutter 55 is brought into contact with the SBBs 39 to push the slider 5 in the longitudinal direction of the slider 5 at first. When the second end face 34 opposing the first end face 33 of the slider 5 comes into contact with the stepped portion 49 on the base 47, the cutting blade 57 of the cutter 55 bites the SBBs 39 in the longitudinal direction of the slider 5 or horizontal direction to press and cut the SBBs 39.

At this time, the cutting force of the cutter 55 to the SBBs 39 and the reaction force due to the cutting force from the stepped portion 49 act on only the slider 5. This prevents the head suspension 1 to be reclaimed from receiving excessive stress in the reclaiming method.

Figure 5C:
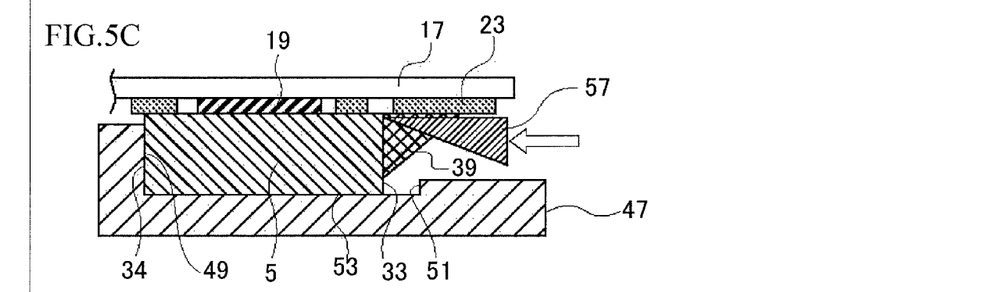

Eventually, the cutter 55 completely cuts the SBBs 39 with the cutting blade 57 in the horizontal direction and the cutting blade 57 reaches the first end face 33 of the slider 5 as illustrated in FIG. 5C.

Figure 5D:
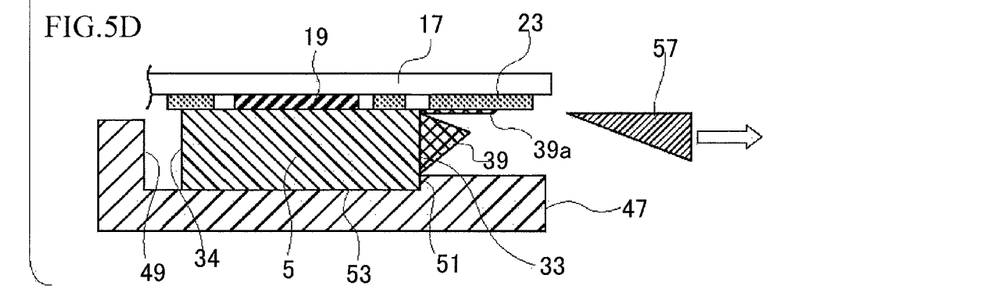

After completely cutting the SBBs 39, the cutter 55 retracts with respect to the guide groove 53 in the longitudinal direction thereof as illustrated in FIG. 5D. With the retraction, the cutter 55 with the cutting blade 57 biting the SBBs 39 moves the slider 5 along the guide groove 53 so that the slider 5 engages with the stepped portion 51 of the guide groove 53 and the cutting blade 57 of the cutter 55 is pulled out of the SBBs 39.

At this time, the pull force acts only on the slider 5 so that it prevents the head suspension 1 to be reclaimed from receiving excessive stress in the reclaiming method.

In this way, the cutting process cuts the SBBs 39 that fixedly connect the terminals 37 of the slider 5 and the respective terminals 23 of the wiring pattern 13 in the HGA. Each of the cut SBBs 39 includes a remaining part 39a that still fixedly connects the terminals 37 and 23, i.e., connects the slider 5 and the tongue 17.

After the cutting process, the removing process is carried out.

Figure 6A:
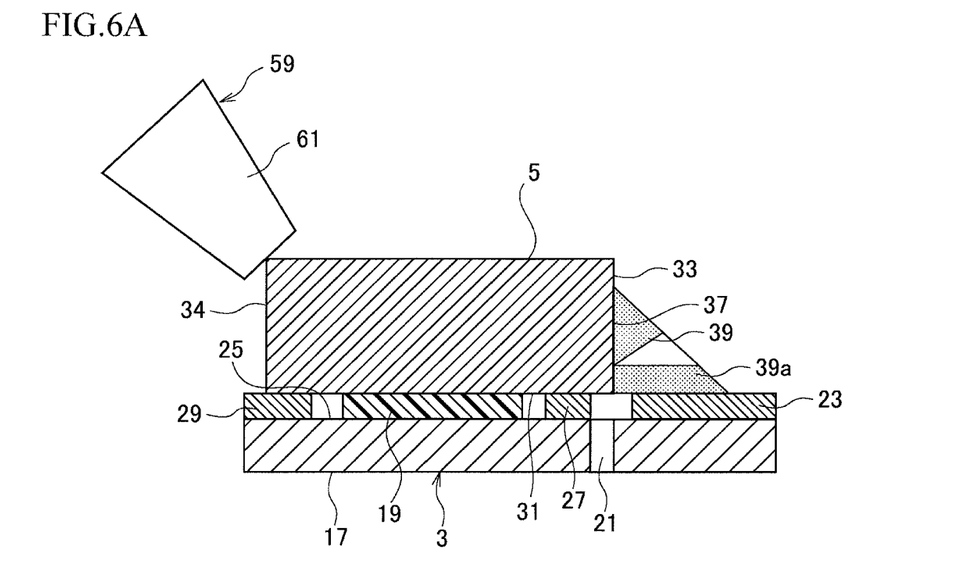
Figure 6B:
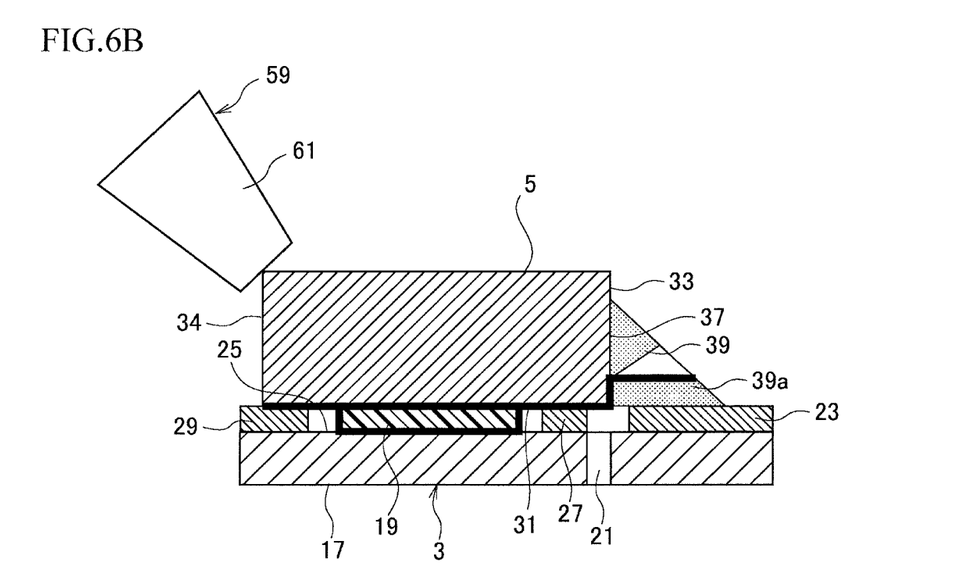
Figure 7A:
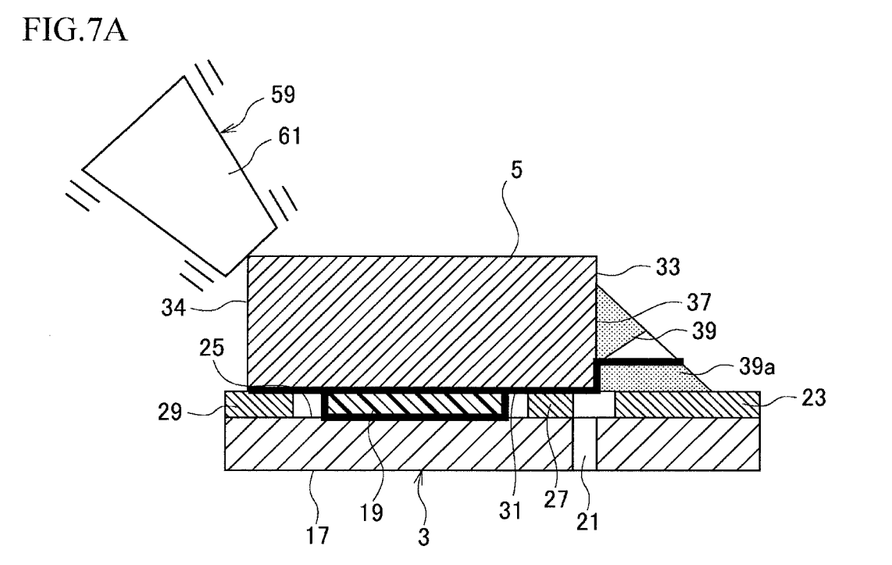
Figure 7B:
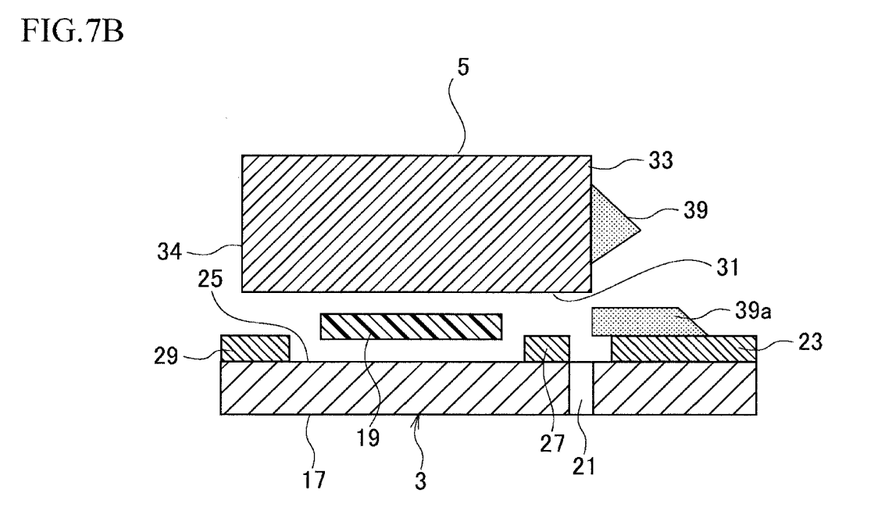
Figure 8:
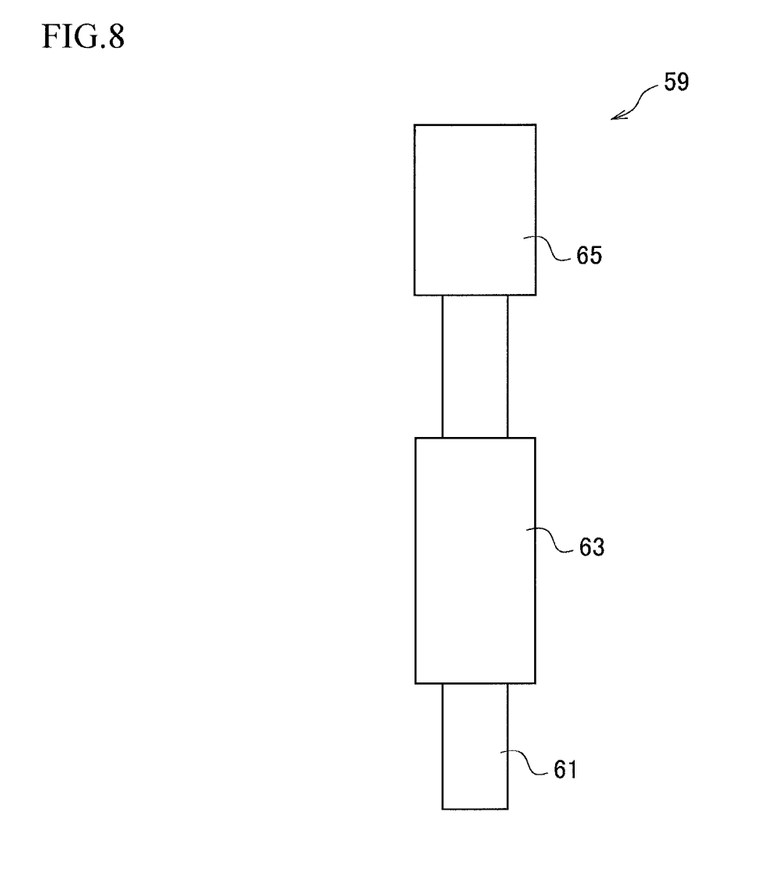
FIG. 8 is aside view schematically illustrating a heating jig according to the embodiment.

FIGS. 6A to 7B are sectional views schematically illustrating the removing process with use of a heating jig and FIG. 8 is a side view schematically illustrating the heating jig of FIGS. 6A to 7B.

As illustrated in FIGS. 6A to 7B, the removing process is carried out as the removing method and uses the heating jig 59. As illustrated in FIG. 8, the heating jig 59 has a tip part 61, a heater 63 as a heat generator, and an oscillator 65 as an ultrasonic vibrator. In the heating jig 59, the tip part 61 receives heat from the heater 63 and ultrasonic vibration from the oscillator 65 to be heated and vibrated at ultrasonic frequency.

A heating temperature of the tip part 61 is set to be able to melt the SBBs 39. For example, the heating temperature is set about 240-270 degrees C. in order to melt lead-free soldering of the SBBs 39.

In the removing process, the tip part 61 of the heating jig 59 is brought into contact with the slider 5 first, as illustrated in FIG. 6A.

In this state, the slider 5 is heated by the heating jig 59, as illustrated in FIG. 6B, In particular, the heater 63 of the heating jig 59 heats the slider 5 through the tip 61 of the heating jig 59. The heated slider 5 heats the adhesive 19 through the adhered surface 31 thereof and the remaining part 39a of each SBB 39 through the first end face 33, as illustrated with a thick line of FIG. 6B.

With the heating, the adhesive 19 and the remaining part 39a of each SBB 39 are Softened. According to the embodiment, the epoxy-based or urethane-based adhesive 19 is softened at a temperature of about 100-200 degree C. lower than that for the SBB 39.

At this time, shearing force due to differential thermal expansion acts on an interface between the adhered surface 31 and the adhesive 19 and an interface between the adhesive 19 and the adhering surface 25 of the tongue 17. Also, shearing force due to differential thermal expansion acts on an interface between the first end face 33 of the slider 5 and the remaining part 39a of each SBB 39.

According to the removing process, ultrasonic vibration is applied to the slider 5 concurrently with the heating, as illustrated in FIG. 7A. In other words, the heating and the applying ultrasonic vibration with respect to the slider 5 are carried out at the same time. However, the ultrasonic vibration is not necessarily applied to the slider 5 concurrently with the heating. For example, the ultrasonic vibration is solely applied to the slider 5 after the heating.

The application of the ultrasonic vibration is carried out by the heating jig 59 so that the oscillator 65 of the heating jig 59 vibrates the slider 5 through the tip 61 of the heating jig 59. As illustrated with a thick line of FIG. 7A, the adhered surface 31 and the first end face 33 on the slider 5 vibrates at ultrasonic frequency relative to the adhesive 19 and the remaining part 39a of each SBB 39, respectively.

With this, the adhered surface 31 causes shearing force due to the ultrasonic vibration on the interface between the adhesive 19 and the adhered surface 31. At the same time, the adhesive 19 receives the ultrasonic vibration from the adhered surface 31 of the slider 5 and causes shearing force due to the ultrasonic vibration on the interface between the adhering surface 25 of the tongue 17 and the adhesive 19. Further, the first end face 33 causes shearing force on the interface between the remaining part 39a of each SBB 39 and the first end face 33.

As a result the slider 5 is detached from the adhesive 19 and the remaining part 39a of each SBB 39 and the adhesive 19 is detached from the adhering surface 25 of the tongue 17 as illustrated in FIG. 7B. This allows the slider 5 and the adhesive 19 to be removed from the tongue 17 of the head suspension 1 or HGA. The detachment of the slider 5 and the adhesive 19 is promoted by cavitation caused in the adhesive 19 due to the ultrasonic vibration.

Although the slider 5 is detached by sequentially bringing the heating jig 59 into contact with the slider 5, heating and vibrating the slider 5 in FIGS. 6A to 7B, in practice, the slider 5 is instantaneously detached by the combination of the heat and the ultrasonic vibration when the heating jig 59 with the heated and vibrating tip portion 61 is brought into contact with the slider 5.

In this way, the slider 5 and the adhesive 19 of the HGA are easily and surely detached and removed from the adhering surface 25 of the tongue 17 without directly applying force to the tongue 17.

After the removing process, the reclaiming method according to the embodiment carries out a finishing process that completely remove a remaining adhesive on the adhering surface 25 of the tongue 17.

For example, a solvent is applied onto the adhering surface 25 of the tongue 17. The solvent may be N-methyl-2-pyrrolidone (NMP) if the adhesive 19 is the epoxy-based adhesive. The solvent easily and surely removes the remaining adhesive because almost all the adhesive 19 is removed from the adhering surface 25 of the tongue 17. The solvent applied onto the tongue 17 may be heated with the tongue 17 to pop up the remaining adhesive from the adhering surface 25 of the tongue 17.

Through the finishing process, the adhesive 19 is completely removed from the tongue 17 without directly applying force to the tongue 17.

In this way, the embodiment reclaims the head suspension 1 through the removal of the slider 5 and adhesive 19. Thereafter, a new slider 5 is attached to the reclaimed head suspension 1 to reclaim the HGA.

As mentioned above, the reclaiming method reclaims the head suspension 1 while shortening required process time and preventing the head suspension 1 from scratching, deforming, and changing in load. As a result, the reclaiming method contributes to improving the yields of head suspensions.

Effects of the embodiment will be explained.

The method of removing the read/write slider 5 from the flexure 3 of the head suspension 1 or HGA, the slider 5 attached to the flexure 3 of the head suspension 1 through the adhesive 19 includes heating the slider 5 so that the adhesive 19 is heated through the adhered surface 31 of the slider 5 being in contact with the adhesive 19; and applying ultrasonic vibration to the slider 5 so that the adhered surface 31 of the slider 5 vibrates at ultrasonic frequency with respect to the adhesive 19.

The adhered surface 31 of the slider 5 causes the shearing force due to the ultrasonic vibration on the interface between the adhered surface 31 and the adhesive 19 that is softened by the heating. As a result, the embodiment never displaces the slider 5 beyond the degree of the ultrasonic vibration and it surely removes the slider 5 from the HGA without large displacement such as rotation on the tongue 17.

Accordingly, the embodiment easily and surely removes the slider 5 even if the piezoelectric elements 41 and 43 as the interferences are positioned around the slider 5, Also, the embodiment prevents the damage of the piezoelectric elements 41 and 43 in this case.

The tongue 17 of the flexure 3 never receives external force that may deform the tongue 17 or the periphery thereof, so that the head suspension 1 is prevented from deforming and changing in load during the removal of the slider 5. Additionally, the head suspension 1 is not scratched when removing the slider 5 without large displacement. As a result, the embodiment provides the removing method helpful for the reclaiming method of the head suspension 1 that improves the yields of head suspensions.

The embodiment prevents from the tongue 17 and the periphery thereof from being contaminated by the softened adhesive 19 and SBBs 39. If the slider 5 is rotated on the tongue 17 like the related art, the slider 5 drags the softened adhesive 19 and SBBs 39 so that the adhesive 19 and SBBs 39 may stick on the tongue 17 and the periphery thereof. The stuck adhesive and SBBs become contamination on the tongue 17 and the periphery thereof such that the contamination causes electrical short circuit between the terminals 23 of the wiring pattern 13 or covers and electrically insulates the terminals 23. The embodiment surely prevents such contamination because the slider 5 does not involve large displacement exceeding the ultrasonic vibration when removing the slider 5.

The embodiment also applies the shearing force due to the differential thermal expansion on the interface between the adhered surface 31 and the adhesive 19, thereby further easily and surely removing the slider 5.

Additionally, the embodiment vibrates the adhesive 19 at ultrasonic frequency through the adhered surface 31 of the slider 5 so that the shearing force due to the ultrasonic vibration is applied to the interface between the adhesive 19 and the adhering surface 25 of the tongue 17. As a result, the adhesive 19 is detached and removed from the adhering surface 25 of the tongue 17 concurrently with the removal of the slider 5.

To the interface between the adhesive 19 and the adhering surface 25 of the tongue 17, the shearing force due to the differential thermal expansion is also applied. This further easily and surely removes the adhesive 19.

Since the heating and applying ultrasonic vibration to the slider 5 are carried out at the same time, the slider 5 is removed quickly.

The heating and applying ultrasonic vibration to the slider 5 are carried out with extreme ease and sureness by bringing the heating jig 59 contact with the slider 5 and vibrating the heating jig 59 at ultrasonic frequency.

The heat is applied to only the slider 5 and the periphery thereof because the slider 5 is heated by the heating jig 59 in contact with the slider 5. The embodiment, therefore, suppresses heat affect on the head suspension 1.

According to the embodiment, the cutting process cuts the SBBs 39 in advance so that the cutter 55 of the cutting jig 45 is pushed against the SBBs 39 from the one side of the slider 5 in the longitudinal direction thereof to cut the SBBs 39 by cutting force while receiving the slider 5 at the other side.

The head suspension 1, therefore, never receives external force that may deform the tongue 17 or the periphery thereof when cutting the SBBs 39. In other words, the embodiment puts the components of the head suspension 1 other than the slider 5 in a stress-free situation so that the head suspension 1 is further prevented from deforming during the removal of the slider 5.

Although the reclaimed head suspension 1 without the slider 5 has the remaining part 39a of each SBB 39, the remaining part 39a is very slight and flat. The reclaimed head suspension 1 allows a new slider 5 to be attached by normal processes.

When cutting the SBBs 39, the cutting jig 45 loosely holds the slider 5 so that the slider 5 is slidably movable in a give range in the longitudinal direction. This configuration allows the cutter 55 of the cutting jig 45 to be pulled out of the SBBs 39 even if the cutter 55 bites the SBBs 39 and is hard to be pulled out of the SBBs 39, In the cutting jig 45 of the embodiment, the cutter 55 presses and cuts, without any difficulty, the SBBs 39 that generally have high degree of hardness while the second end face 33 opposing the first end face 33 of the slider 5 is into contact with the stepped portion 49 of the cutting jig 45. Therefore, the cutting jig 45 is used for cutting the SBBs 39 to provide the favorable reclaiming method of the head suspension 1.

In a case where the cutting process is carried out at room temperature, it prevents the head suspension 1 from being contaminated due to scatter of melting solder that may be caused by a cutting process carried out under heating.

in a case where the SBBs 39 are made of lead-free solder and the heating temperature of the heating jig 59 is set to melting temperature of the lead-fee solder, the remaining parts 39a of the SBBs 39 are momentarily melted and softened by heating with use of the heating jig 59. The remaining parts 39a never hinders the removal of the slider 5 from the tongue 17 and the temperature realizes to soften the adhesive 19.

What is claimed:

1. A method of removing a read/write slider from a flexure of a head suspension, the slider attached to the flexure of the head suspension through an adhesive, comprising:

heating the slider so that the adhesive is heated through an adhered surface of the slider being in contact with the adhesive, applying ultrasonic vibration to the slider so that the adhered surface of the slider vibrates at a first ultrasonic frequency with respect to the heated adhesive to cause a shearing force due to the ultrasonic vibration on an interface between the heated adhesive and the adhered surface, thereby to detach the slider from the heated adhesive; and removing the detached slider from the flexure; and wherein said heating comprises bringing a heating jig into contact with the slider; and wherein said applying comprises vibrating the heating jig at a second ultrasonic frequency.

2. A method of removing a read/write slider from a flexure of a head suspension, the slider attached to the flexure of the head suspension through an adhesive, comprising:

heating the slider so that the adhesive is heated through an adhered surface of the slider being in contact with the adhesive;

applying ultrasonic vibration to the slider so that the adhered surface of the slider vibrates at a first ultrasonic frequency with respect to the heated adhesive to cause a shearing force due to the ultrasonic vibration on an interface between the heated adhesive and the adhered surface, thereby to detach the slider from the heated adhesive; and removing the detached slider from the flexure;

wherein the heating and applying are performed concurrently;

wherein said heating comprises bringing a heating jig into contact with the slider; and wherein said applying comprises vibrating the heating jig at a second ultrasonic frequency.

3. A method of detaching a read/write slider from a flexure of a head suspension, in which the slider is attached to the flexure of the head suspension through an adhesive before said detaching, comprising:

heating the slider so that the adhesive is heated through an adhered surface of the slider, the adhered surface being in contact with the adhesive;

applying ultrasonic vibration to the slider so that the adhered surface of the slider vibrates at a first ultrasonic frequency with respect to the heated adhesive; and vibrating the adhered surface at the first ultrasonic frequency so that a shearing force action of said vibrating acts at an interface between the heated adhesive and the adhered surface to accomplish said detaching of the slider from the heated adhesive, and wherein said detaching accomplished by said vibrating of the adhered surface is a complete detachment of said slider from said heated adhesive.

4. The method of claim 3, wherein the heating and applying are performed concurrently.

\* \* \* \* \*